United States Patent Office 3,827,993
Patented Aug. 6, 1974

3,827,993
LIQUID POLYOL COMPOSITIONS
Arthur L. Cunningham, Park Forest, Cyriac C. Poovathunkal, Chicago, and William J. Yapp, Park Forest, Ill., assignors to The Sherwin-Williams Company, Cleveland, Ohio
No Drawing. Filed June 14, 1972, Ser. No. 262,832
Int. Cl. C08g 17/16; C07d 3/64
U.S. Cl. 260—22 EP                    14 Claims

ABSTRACT OF THE DISCLOSURE

This invention is directed to liquid polyols obtained by reacting at least one polyhydroxy compound, e.g. glycol with an epoxidized fatty oil or epoxidized fatty-acid ester, and one or more carboxylic acids or derivatives thereof. The polyols are particularly useful in preparing films, coatings, plastic compositions and the like.

---

This invention relates to liquid polyol compositions and to the methods of preparing same and more specifically to a liquid polyol derived from at least one epoxidized fatty oil or epoxidized fatty acid ester, at least one polyhydroxy compound, e.g. a glycol and at least one carboxylic acid or acid-producing compound, e.g. the anhydride. The liquid polyols are particularly useful in the preparation of films, coatings and various plastics of different degrees of hardness, flexibility, impact strength, etc. The polyols may be characterized as being liquid compounds having both ether and ester groups with at least two unreacted hydroxy groups distributed randomly in the molecule.

Generally, polyurethanes are derived from isocyanates, e.g. polyisocyanates and various alcohols although it is desirable to use ether or ester-containing alcohols which are known to impart improved physical characteristics to the products. While both polyether and polyester-containing alcohols and combinations thereof have been utilized, the liquid polyols of this invention are unique in that they contain a large number of unreacted hydroxyl groups in comparison to the number of ether and ester groups and, therefore, are especially useful in preparing rigid polyurethane foams.

Accordingly, it is an object of this invention to provide liquid polyols which may be used to prepare clear or pigmented protective coatings and films. It is another object of this invention to provide liquid polyols for preparing tough, resilient films which are mar-resistant and have good adhesion to various substrates. It is a further object of this invention to provide liquid polyols having both ether and ester groups which are particularly useful in formulating urethanes. These and other objects will become apparent from a further and more detailed description of the invention.

Specifically, this invention relates to liquid polyols obtained by contacting and reacting at a temperature of at least 25° C. and in the presence of an effective amount of catalyst (a) from about 20 to 60% by weight of at least one epoxidized fatty-acid ester or epoxidized fatty oil having an oxirane oxygen content ranging from about 1 to 12% by weight with (b) about 30 to 45% by weight of an aliphatic polyhydroxy compound, e.g. an aliphatic polyhydric alcohol to obtain an intermediate and subsequently reacting said intermediate with (c) about 1.0 to 34% by weight of at least one polycarboxylic acid or acid-producing compound, e.g. phthalic anhydride and (d) 0 to 21% by weight of a monocarboxylic fatty acid or a derivative thereof.

The polyol intermediates are obtained by reacting at a temperature of at least about 25° C. and preferably at a temperature of at least about 100° C. in the presence of an effective amount of catalyst, e.g. sodium hydroxide, from about 20 to 60% by weight and preferably from about 30 to 50% by weight of the total reactants of (a) at least one epoxidized fatty oil or epoxidized fatty-acid ester having an oxirane oxygen content ranging from about 1 to 12% and preferably from about 2 to 10% by weight with (b) at least one polyhydroxy compound e.g. an alkylene glycol. The ether-containing polyol intermediates are subsequently reacted with a carboxylic acid or a derivative thereof to obtain polyols having both ether and ester groups.

The epoxy-containing esters or oils include the curable epoxidized esters of fatty acids having up to about 36 aliphatic carbon atoms and preferably from 6 to 22 aliphatic carbon atoms in the acid radical and up to about 16 and preferably from 4 to 12 carbon atoms in the mono- or polyhydric alcohol radical. The esters that may be used in preparing the oxirane-containing fatty acid esters include the natural occurring and synthetically prepared esters of the unsaturated monocarboxylic acids found in various drying oils or semi-drying oils, such as soybean oil, safflower oil, etc. Generally, the alcohol radical of these esters are derived from polyhydroxy alcohols having at least two hydroxy groups per molecule. However, the esters, e.g. unsaturated esters may be derived from simple polyhydroxy alcohols such as glycerol, pentaerythritol, etc. chemically combined with one or more of the above-mentioned fatty acids.

Other fatty acid esters may be prepared by reacting various alcohols, e.g. the mono- and polyhydroxy alcohols with one or more fatty acids to obtain esters. The alcohols that may be used to prepare the esters include, for example, the monohydric alkyl and alkenyl alcohols which provide the alcohol moiety such as methyl, ethyl, propyl, isopropyl, butyl, isobutyl, amyl, isoamyl, hexyl, heptyl, octyl, etc. The dihydric alcohols include, for example, glycols such as ethylene glycol, propane diol, 1,2-propane diol, dimethyl glycol, trimethylene glycol, pentamethylene glycol, hexamethalene glycol, etc. Other polyhydric alcohols that may be used include glycerol, erythritol, pentaerythritol, mannitol, sorbitol, etc. The various alcohols either alone or in combination may be reacted with a fatty acid to obtain esters which are epoxidized by known techniques to obtain the epoxidized esters having the required oxirane oxygen content.

The natural occuring drying or semi-drying oils comprise the unsaturated fatty esters which have the characteristics of solidifying and hardening when exposed to air. Therefore, for purposes of this invention, one or more of these natural fatty-acid esters may be reacted with an epoxidizing agent, e.g. peracetic acid in amounts sufficient to obtain an epoxidized ester having from about 1 to 12% by weight of oxirane oxygen. In addition to peracetic acid, other known epoxidizing agents include the various aliphatic, aromatic and inorganic peracids, salts of said acids, peroxides, hydroperoxides, etc. Preferably, however, the aliphatic peracids such as performic, peracetic, perpropionic, etc. are used as the epoxidizing agents. The epoxidation of fatty acid esters and fatty oils is known and the products for purposes of this invention are presently available as pointed out, for example, in U.S. Pat. 2,569,502.

Some specific examples of the various epoxy-containing fatty acid esters derived from aliphatic fatty acids, include methyl epoxystearate, ethyl epoxystearate, isopropyl epoxystearate, butyl epoxystearate, epoxidized 2-ethylhexyl tallate, epoxidized 1,5-pentane dioldioleate, epoxidized 1,2,6-hexane-trioldioleate monoacetate, epoxidized methyloleate, epoxidized glycerol trilinoleate, epoxidized glycerol monooleate, epoxidized glycerol monolinoleate, epoxidized glycerol monostearate dilinoleate, epoxidized esters of mono-, di-, or poly-pentaerythritol with soy, tall or linseed fatty acid and various mixtures of these esters in any proportion. Examples of the epoxidized fatty oils include epoxidized lard oil, epoxidized peanut oil, epoxidized olive oil, epoxidized safflower oil, epoxidized castor oil, epoxidized neats foot oil, epoxidized corn oil, epoxidized cotton seed oil, epoxidized soybean oil, epoxidized perilla oil, epoxidized menhaden oil, epoxidized linseed oil, etc.

Obviously, epoxidized esters of different types and oxirane values may be blended to obtain the desired characteristics, e.g. to improve the drying speeds, etc. These epoxidized oils are readily obtained by reacting ,for example, the oil or triglyceride which contains at least one double bond with paracetic acid at comparatively low temperatures. During the reaction, the ethylenic groups or double bonds of the triglyceride are converted to epoxy groups without otherwise altering the molecular structure of the glyceride. As indicated, animal, vegetable and marine triglycerides are well known in the art as natural occuring ethylenic unsaturated materials. These materials can be epoxidized by known methods to provide epoxidized fatty esters having varying amounts of oxirane groups.

The polyhydroxy compounds to be reacted with the epoxidized fatty oils or fatty acid esters to obtain the polyol intermediates may have up to 40 aliphatic or cycloalpihatic carbon atoms, e.g. $C_2$–$C_{22}$, and from 2 to 10 and preferably from 2 to 6 hydroxy groups per molecule. The polyhydroxy compounds are present in amounts ranging from about 30 to 45% by weight of the total reaction mixture and includes various polyhydric alcohols such as the alkylene glycols, e.g. ethylene glycol, propylene glycol, butylene glycol, diethylene glycol, triethylene glycol, tetraethylene glycol, dipropylene glycol, tripropylene glycol, tetrapropylene glycol, tributylene glycol, dibutylene glycol, 1,3-propylene glycol, 1,3-butylene glycol, 1,2-propane diol, 1,3-propane diol, 1,4-butane diol, dimethylethylene glycol, trimethylene glycol, tetramethylene glycol, pentamethylene glycol, pentaethylene glycol, hexamethylene glycol, 1,6-hexane diol, and various polyglycols having from 2 to 10 aliphatic carbon atoms and at least two and preferably at least three hydroxy groups per molecule, e.g. glycerol, erythritol, pentaerythritol, the hexitols such as mannitol and sorbitol. Included also are the cycloaliphatic diols such as cyclopentane diol, cyclohexane diols, cycloheptane diol, cyclooctane diol etc. Other higher molecular weight polyhydroxy compounds may include, for example, the polypropylene glycols, polybutylene glycols, polyethylene glycols and other polyalkylene glycols or polyoxyalkylene glycols and the polyglycerols such as the diglycerols, triglycerols, glycerol trimethylolethane, glycerol trimethylolpropane, 1,2,6-hexane triol, tetrahydroxy butane, tetrahydroxy pentane, tetrahydroxy octane, tetrahydroxy heptane, the polypentaerythritols and various polymeric low molecular weight polyhydroxy compounds either alone or in combination.

The polycarboxylic acids or acid-producing compounds to be reacted with the ether-containing polyol intermediates have at least two carboxylic acid or acid-producing groups and up to 40 carbon atoms. These polycarboxylic acids include the alkyl, aryl, alkaryl and cycloalkyl polycarboxylic acids or acid-producing compounds, i.e. derivatives of carboxylic acids. The derivatives of the acids may be selected from the class consisting of the anhydrides of the polycarboxylic acids, the low molecular weight esters, i.e. $C_1$–$C_8$ esters such as the methyl, ethyl or propyl esters, etc. the salts, e.g. ammonia salt, the nitrogen derivatives such as the amides, imides, amidines and the various other derivatives of polycarboxylic acids that may be used, as chemical equivalents, to produce acid groups for esterifying the ether-containing polyol intermediates.

Some specific examples of the polycarboxylic acids, e.g. the dicarboxylic acids, the anhydrides and derivatives thereof include maleic acid, succinic acid, chlorendic anhydride, phthalic anhydride, tetrahydrophthalic anhyride, hexahydrophthalic anhydride, Nadic anhydride, oxalic acid, adipic acid, citraconics, terephthalic acid, isophthalic acid, sebacic acid, azelaic acid, mellitic acid, pyromellitic acid, fumaric acid, itaconic acid, the alkyl or alkenyl substituted succinic acids, the dimerized fatty acids, diglycollic acid and various tricarboxylic acids such as 1,2,3-propane tricarboxylic acid, citric acid, trimellitic acid, trimesic acid, etc. The polycarboxylic acids and especially the dicarboxylic acids are used either alone or in combination in amounts ranging from about 1 to 34% and preferably in an amount ranging from 1 to 16% by weight of the total amount of reactants.

One or more of the polycarboxylic acids or acid-producing acylating compounds, e.g. phthalic anhydride are added to the reaction mixture at temperature of at least about 100° C. and preferably at temperatures of at least about 150° C. to esterify some of the hydroxyl groups of the ether-containing intermediate to form a liquid polyol composition having both ether and ester groups randomly distributed in the molecule.

In addition to the polycarboxylic acids or the derivatives thereof, it may be desirable to react from about 0 to 21% by weight of a monocarboxylic fatty acid or acid-producing compound e.g. a halide or ester of the fatty acid which reacts also some of the hydroxyl groups of the ether-containing polyol intermediate to form randomly distribute mono-ester groups.

The monocarboxylic acids include, for example, any of the natural or synthetically prepared fatty acids such as linseed oil fatty acids, linoleic acids, hempseed oil acid, cotton seed oil fatty acid, poppyseed fatty acid, rapeseed fatty acid, soybean fatty acid, tall oil fatty acid, tung oil fatty acid, fish oil fatty acid, safflower fatty acid, acetic acid, butyric acid, propionic acid, caproic acid, caprylic acid, lauric acid, myristic acid, pentadecanoic acid, palmitic acid, stearic acid, behenic acid, hyenic acid, acrylic acid, sorbic acid, linoleic acid, linolinic acid and various derivatives including the halides, salts and low molecular weight esters, e.g. methyl ester and other acid-producing compounds having up to 32 aliphatic carbon atoms per molecule. Thus, various derivatives or chemical equivalents of the monocarboxylic acids may be used to esterify the ether-containing polyol intermediates.

In preparing the liquid polyol compositions of this invention, it is important that the epoxidized fatty oils and epoxidized fatty-acid esters are reacted, initially, with the polyhydroxy compounds, e.g. ethylene glycol in the stated proportions and in the presence of a catalytic amount of a catalyst to obtain the corresponding ether-containing polyol intermediates.

The catalyst present during the initial reaction of the epoxidized fatty-acid oils or fatty-acid esters with the polyhydroxy compounds are known compounds and include, for example, the alkali metal hydroxides, e.g. sodium, lithium and potassium hydroxides as well as the amines, e.g. tertiary amines, the Lewis acids and the Friedel-Crafts catalyst such as the halides of boron, e.g. boron trifluoride, halides of iron, aluminum, antimony, tin, zinc, arsenic, etc. The tertiary amines that may be used include the aryl amines, dialkyl amines, the lower trialkyl amines and the trialkylolamines. Of these catalysts, the boron trifluoride and boron trifluoride complexes are particularly preferred in addition to the alkali metal compounds, e.g. the alkali metal hydroxides and the lower alkoxides of various metals including, for example, aluminum and titanium propoxides, butoxides, etc. The catalysts are used in a small but effective catalytic amount ranging from about 0.001 to 3.0% and preferably in amounts ranging from about 0.1% to 1.0% by weight of the epoxide reactant depending upon the activity of the particular catalyst employed.

The polyol intermediates are subsequently reacted with one or more of the carboxylic acids, e.g. mono- or dicarboxylic acids either alone or in combination at temperatures, e.g. of at least about 100° C. to obtain the liquid polyols.

The etherification reaction takes place at temperatures as low as 25° C. and preferably at least about 100° C. while the esterification reaction takes place, preferably at temperatures above about 100° C. and up to 300° C., e.g. 125° to 250° C. Since the polyols of this invention are liquids, there is no need to use a solvent. If desired, however, a small amount of solvent may be used for a particular purpose and may include, for example, the aromatic and aliphatic hydrocarbons, e.g. xylene, benzene, toluene, aliphatic ketones, such as the acetones, methyl ethyl ketone, cyclohexanone, xylol, naphtha, mineral spirits and various other organic liquids employed in the chemical and particularly the coating industry.

The following examples illustrate the liquid polyol compositions and their use for purposes of this invention.

EXAMPLE 1

| Reactants: | Parts by weight |
| --- | --- |
| Epoxidized soy oil | 1050 |
| Diethylene glycol | 960 |
| Phthalic anhydride | 200 |
| Sodium hydroxide | 5.0 |

The epoxidized soy oil, diethylene glycol and sodium hydroxide were admixed in a reaction vessel equipped with a stirrer, condenser connected to a reflux condenser, temperature measuring device and inert-gas sparge tube. The reactants were heated to temperatures of about 177° C. and maintained at this temperature for about two hours over which period the oxirane content of the intermediate product dropped to approximately 0.5%. Phthalic anhydride was added to the reaction vessel and the temperature was raised to about 232° to 238° C. and maintained at this temperature until the acid number dropped to approximately 5.0. The final product had an acid value of about 4.0, a color (Gardner) of 15-16, a viscosity of about 1600 cps., and a hydroxyl number of 397.

EXAMPLE 2

| Reactants: | Parts by weight |
| --- | --- |
| Epoxidized soy oil | 393 |
| Diethylene glycol | 500 |
| Sodium hydroxide | 1.0 |
| Phthalic anhydride | 100 |
| Tall oil fatty acid | 141 |

The epoxidized soy oil, diethylene glycol and sodium hydroxide were admixed in a reaction vessel similar to the equipment recited in Example 1. The reactants were heated to a temperature of about 177° C. and maintained at that temperature for about two hours during which time the oxirane content of the intermediate product dropped to approximately 0.5. The final product had an acid value of 5, a color (Gardner) of 7–8, a viscosity (Gardner-Holdt) of T–U, and a hydroxyl number of 373.

EXAMPLE 3

| Reactants: | Parts by weight |
| --- | --- |
| Epoxidized corn oil (oxirane oxygen content of about 7%) | 400 |
| Pentaerythritol | 500 |
| Sodium hydroxide | 1.0 |
| Maleic anhydride | 50 |

EXAMPLE 4

| Reactants: | Parts by weight |
| --- | --- |
| Epoxidized 2-ethylhexyl tallate (oxirane oxygen content of about 4.6%) | 350 |
| Diglycerol | 600 |
| Phthalic anhydride | 60 |
| Succinic anhydride | 40 |
| Sodium hydroxide | 1.0 |

EXAMPLE 5

| Reactants: | Parts by weight |
| --- | --- |
| Epoxidized soya oil | 1050.0 |
| Diethylene glycol | 960.0 |
| NaOH | 1.0 |
| Phthalic anhydride | 200.0 |
| Isophthalic acid | 830.0 |
| Pentaerythritol | 66.0 |

EXAMPLE 6

| Reactants: | Parts by weight |
| --- | --- |
| Epoxidized soya oil | 1050 |
| Diethylene glycol | 960 |
| Phthalic anhydride | 100 |
| Fumaric acid | 78 |
| NaOH | 1.0 |

EXAMPLE 7

| Reactants: | Parts by weight |
| --- | --- |
| Epoxidized soya oil | 1050 |
| Diethylene glycol | 801 |
| Phthalic anhydride | 100 |
| Trimethylol ethane | 120 |
| Tall oil fatty acid | 144 |
| NaOH | 1.0 |

EXAMPLE 8

| Reactants: | Parts by weight |
| --- | --- |
| Phthalic anhydride | 100 |
| Epoxidized linseed oil | 720 |
| Ethylene glycol | 468 |
| Adipic acid | 99 |
| Trimethylol propane | 156 |
| NaOH | 1.0 |

EXAMPLE 9

| Reactants: | Parts by weight |
| --- | --- |
| Epoxidized soya oil | 1050 |
| Phthalic anhydride | 100 |
| Propylene glycol | 384 |
| Tall oil fatty acid | 144 |
| Neopentyl glycol | 416 |
| NaOH | 1.0 |

EXAMPLE 10

| Reactants: | Parts by weight |
| --- | --- |
| Epoxidized soya oil | 1050 |
| Phthalic anhydride | 100 |
| Tall oil fatty acid | 144 |
| 1,4-butylene glycol | 680 |
| Glycerol | 94 |
| NaOH | 1.0 |

In Examples 3 to 10, the liquid polyols were prepared in the presence of a catalyst by following the procedure set forth in Example 1.

The liquid polyol compositions of this invention which contain both ether and ester groups may be used effectively for preparing rigid polyurethane foams by reacting the polyols with various organic polyisocyanates. The amount of polyisocyanates required to obtain a satisfactory composition depends on the particular polyol employed and the number of reactive hydroxyl groups present. Thus, polyurethane compositions characterized as having excellent physical and chemical properties can be prepared by reacting the polyols with a polyisocyanate to obtain a rigid foam having improved toughness, thermal and color stability, excellent shrinking characteristics etc.

The preferred polyurethanes are obtained from polyols characterized as having low acid values, e.g. less than 6 and equivalent weights ranging from about 100 to 500 which is determined by the number of hydroxyl groups present in the molecule. The urethane obtained from liquid polyols having a high equivalent weight result in rigid foams resembling wood in appearance and are particularly resistant to mechanical abuse in constrast to some of the materials presently available. These foams may be obtained by utilizing polyisocyanates having at least two isocyanate groups such as, 2,4-tolylene-diisocyanate, 1,4-phenylene-diisocyanate, 1,3-phenylene-diisocyanate, 1,5-naphthalene-diisocyanate, etc. The foams are prepared by reacting the polyols with the polyisocyanates under conditions generally known for the preparation of polyurethanes and may contain some of the conventional components such as catalysts, surfactants, blowing agents, pigments stabilizing agents, etc.

The following illustrates the use of the liquid polyols of this invention for the preparation of polyurethanes.

EXAMPLE A

Reactants: Parts by weight
Water _____ 0.5
Surfactant DC-193 (Dow Corning) [1] _____ 1.0
Catalyst Dabco 33-LV (Houdry) [2] _____ 0.5
Polyol of Example 1 _____ 98
2,4-toluene diisocyanate _____ 40

[1] A low viscosity silicone-glycol copolymer.
[2] ⅓ triethylene diamine; ⅔ dipropylene glycol.

EXAMPLE B

Reactants: Parts by weight
Polyol of Example 1 _____ 65.0
Hexakis methoxymethyl melamine _____ 35.0
Sodium sulphated dioctyl succinate _____ 0.5

The above compositions are crosslinked by baking, for example, for about ½ hour at a temperature of about 150° C. to obtain a film or coating having excellent hardness and mar-resistance for a variety of applications.

The polyurethane compositions may be used as coatings for a variety of substrates including wood, metal, etc. and can be applied by conventional techniques including spraying, dipping, brushing, roller coating, etc. Since the polyols are liquids of low viscosity, there is no need to use solvents in preparing the various coating compositions. However, if desirable, the compositions may be diluted with known solvents e.g. ketones, esters, ethers, etc. and may contain a pigment or other known additive.

While this invention is described by a number of specific embodiments, it is obvious that other variations and modifications can be made without departing from the spirit and scope of the invention as particularly pointed out in the appended claims.

What is claimed is:

1. A liquid polyol obtained by contacting and reacting at a temperature of at least 25° C. based on the weight of the total reactants (a) from about 20 to 60% by weight of at least one epoxidized-fatty acid ester or epoxidized-fatty oil having an oxirane oxygen content ranging from about 1 to 12% by weight with (b) about 30 to 45% by weight of an aliphatic polyhydroxy compound having from 2 to 10 hydroxy groups to obtain an intermediate and subsequently reacting said intermediated with (c) about 1.0 to 34% by weight of at least one polycarboxylic acid or polycarboxylic acid-producing compound and (d) 0 to 21% by weight of a monocarboxylic fatty acid.

2. The polyol of claim 1 further characterized in that the epoxidized-fatty oil is an epoxidized-vegetable oil having an oxirane oxygen content ranging from about 2 to 10% by weight.

3. The polyol of claim 1 further characterized in that the epoxidized-fatty acid ester is an epoxidized-fatty acid ester having an oxirane oxygen content ranging from about 2 to 10% by weight and is derived from an unsaturated fatty acid and a polyhydroxy aliphatic alcohol.

4. The polyol of claim 1 further characterized in that the polyhydroxy compound is a glycol having from 2 to 6 hydroxy groups per molecule.

5. The polyol of claim 1 further characterized in that the polycarboxylic acid-producing compound is phthalic anhydride.

6. The polyol of claim 1 further characterized in that the polycarboxylic acid-producing compound is a polycarboxylic acid ester of a low molecular weight aliphatic alcohol.

7. The polyol of claim 1 further characterized in that the polycarboxylic acid or acid-producing compound is maleic acid or the anhydride thereof.

8. The polyol of claim 1 further characterized in that the polycarboxylic acid or acid-producing compound is succinic acid or the anhydride thereof.

9. The polyol of claim 1 further characterized in that the monocarboxylic fatty acid is a vegetable oil fatty acid.

10. A process for preparing a liquid polyol composition which comprises contacting and reacting in the presence of an effective amount of catalyst at a temperature of at least about 25° C. based on the total weight of the reactants (a) about 20% to 60% by weight of an epoxidized-fatty oil or epoxidized-fatty acid ester having an oxirane oxygen content ranging from about 1% to 12% by weight with (b) about 30% to 45% by weight of an aliphatic polyhydroxy compound having from 2 to 10 hydroxy groups to obtain a polyol intermediate and subsequently reacting said intermediate at a temperature of at least about 100° C. with (c) about 1% to 34% by weight of a polycarboxylic acid or polycarboxylic acid-producing compound and (d) 0 to 21% by weight of a monocarboxylic fatty acid.

11. The process of claim 10 further characterized in that the epoxidized-fatty oil or epoxidized-fatty acid ester is reacted with the polyhydroxy compound at a temperature of at least about 100° C. in the presence of an alkaline catalyst and the intermediate is subsequently reacted with the polycarboxylic acid or acid-producing compound at a temperature of at least about 150° C.

12. The process of claim 11 further characterized in that the aliphatic polyhydroxy compound is a glycol and the polycarboxylic acid-producing compound is phthalic anhydride.

13. The process of claim 10 further characterized in that the catalyst is a Friedel-Crafts catalyst.

14. The process of claim 11 further characterized in that the alkaline catalyst is sodium hydroxide.

References Cited
UNITED STATES PATENTS

| | | | |
|---|---|---|---|
| 3,066,159 | 11/1962 | De Groote et al. | 260—404 |
| 3,264,236 | 8/1966 | Santamello | 260—22 T N |
| 3,397,255 | 8/1968 | Coats et al. | 260—850 |
| 3,502,601 | 3/1970 | Case et al. | 260—31.2 N |
| 3,520,841 | 7/1970 | Graver et al. | 260—33.6 UA |

DONALD E. CZAJA, Primary Examiner

R. W. GRIFFIN, Assistant Examiner

U.S. Cl. X.R.

117—161 K, 161 KP, 161 ZB; 260—2.5 AN, 21